(12) United States Patent
Kuang et al.

(10) Patent No.: US 9,172,869 B2
(45) Date of Patent: Oct. 27, 2015

(54) IMAGE DATA AGGREGATING HIGH DYNAMIC RANGE IMAGING SYSTEMS AND ASSOCIATED METHODS

(71) Applicant: OmniVision Technologies, Inc., Santa Clara, CA (US)

(72) Inventors: Jiangtao Kuang, Sunnyvale, CA (US); Jizhang Shan, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 99 days.

(21) Appl. No.: 14/097,015

(22) Filed: Dec. 4, 2013

(65) Prior Publication Data

US 2015/0156412 A1    Jun. 4, 2015

(51) Int. Cl.
*H04N 5/225* (2006.01)
*H04N 5/232* (2006.01)
*H04N 5/235* (2006.01)

(52) U.S. Cl.
CPC .................................. *H04N 5/23232* (2013.01)

(58) Field of Classification Search
CPC ... H04N 5/23254; H04N 5/235; H04N 5/238; G03B 7/00; G03B 7/003; G03B 9/08; G03B 9/58; G03B 9/64; G03B 2207/00; G06T 5/009

USPC .......... 348/220.1, 222.1, 224.1, 227.1, 229.1; 382/167–169, 266, 273–275
See application file for complete search history.

(56) References Cited

U.S. PATENT DOCUMENTS

| | | | |
|---|---|---|---|
| 7,430,011 B2 | 9/2008 | Xu et al. | |
| 2010/0002106 A1* | 1/2010 | Granquist-Fraser | 348/294 |
| 2010/0302407 A1* | 12/2010 | Ayers et al. | 348/230.1 |
| 2012/0092534 A1* | 4/2012 | Li et al. | 348/255 |
| 2012/0281111 A1* | 11/2012 | Jo et al. | 348/229.1 |
| 2014/0347521 A1* | 11/2014 | Hasinoff et al. | 348/239 |

* cited by examiner

*Primary Examiner* — Kelly L Jerabek
(74) *Attorney, Agent, or Firm* — Lathrop & Gage LLP (57) ABSTRACT

An image data aggregating high dynamic range imaging system includes an image sensor for generating N image data sets from an array of photodiodes, where N is an integer greater than one. The image sensor is adapted to generate each of the N image data sets with a different respective exposure time duration of the array of photodiodes. The system further includes an image data aggregating module for aggregating the N image data sets to obtain a virtual long exposure image data set.

15 Claims, 5 Drawing Sheets

(PRIOR ART)

IMAGE DATA AGGREGATING HIGH DYNAMIC RANGE IMAGING SYSTEMS AND ASSOCIATED METHODS

BACKGROUND

Conventional image sensors have a limited dynamic range, such as from 60 dB to 70 dB. Many scenes, however, have a much larger dynamic range. For example, natural scenes often have a dynamic range of 90 dB or more. Therefore, techniques have been developed to extend image sensor dynamic range.

For example, multiple exposure techniques have been developed to obtain a single high dynamic range image from multiple exposures of a conventional image sensor. In these techniques, multiple image data sets are generated, where each image data set is generated with a different exposure time duration of the image sensor's photodiodes. The multiple image data sets can be sequentially generated one after another. Alternately, the multiple image data sets can be generated partially in parallel using a rolling shutter technique, thereby reducing delay between sequential exposures of a given pixel. The high dynamic range image is subsequently generated by selecting between the multiple image data sets according to one or more criteria, for each pixel location represented by the high dynamic range image. In multiple exposure techniques, the image data sets do not temporally overlap at a given pixel location, resulting in motion artifacts when the image scene changes between the multiple image data sets.

Figure 1:
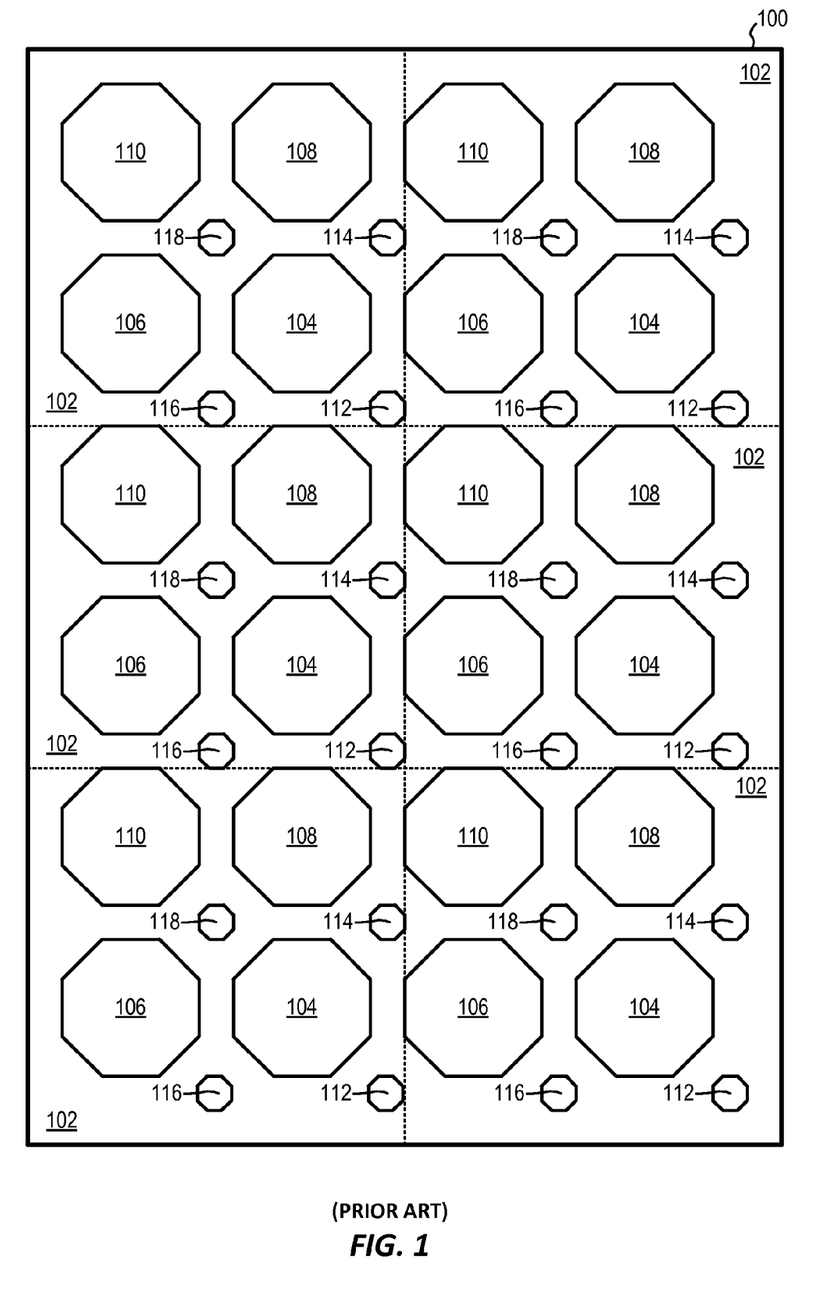
FIG. 1 is a top plan view of a prior art split-pixel image sensor.

High dynamic range image sensors have also been developed. One example of high dynamic range image sensors is split-pixel image sensors. These image sensors are characterized by each pixel including at least two different photodiodes optimized for light of a different intensity range. For instance, FIG. 1 is a top plan view of a prior art split-pixel image sensor 100 including multiple pixels 102. Each pixel 102 includes four large photodiodes 104, 106, 108, 110 and four small photodiodes 112, 114, 116, 118. Large photodiodes 104, 106, 108, 110 are optimized for capturing high intensity light, and small photodiodes 112, 114, 116, 118 are optimized for capturing low intensity light. Each pixel 102 include a Bayer color filter array, such that large photodiodes 104 and small photodiodes 112 are adapted to capture red-color light, large photodiodes 106, 108 and small photodiodes 114, 116 are adapted to capture green-color light, and large photodiodes 110 and small photodiodes 118 are adapted to capture blue-color light.

Large photodiodes 104, 106, 108, 110 generate a first image data set optimized for high intensity light, and small photodiodes 112, 114, 116, 118 generate a second image data set optimized for low intensity light. A high dynamic range image is generated by selecting between the first and second image data sets according to one or more criteria, for each pixel location represented by the high dynamic range image. The first and second image data sets typically at least partially temporally overlap, and split-pixel image sensor 100 is therefore significantly less prone to motion artifacts than imaging systems using multiple exposure techniques. However, the fact that each pixel 102 includes at least eight photodiodes reduces available surface area for large photodiodes, thereby making it difficult to obtain high sensitivity under low light conditions.

SUMMARY

In an embodiment, a method for generating a virtual long exposure image data set includes (1) generating N image data sets from an array of photodiodes, each of the N image data sets being generated with a different respective exposure time duration of the array of photodiodes, where N is an integer greater than one, and (2) aggregating the N image data sets to obtain the virtual long exposure image data set.

In an embodiment, an image data aggregating high dynamic range imaging system includes an image sensor for generating N image data sets from an array of photodiodes, where N is an integer greater than one. The image sensor is adapted to generate each of the N image data sets with a different respective exposure time duration of the array of photodiodes. The system further includes an image data aggregating module for aggregating the N image data sets to obtain a virtual long exposure image data set.

DETAILED DESCRIPTION OF THE EMBODIMENTS

Applicants have discovered that one or more of the drawbacks discussed above can be reduced, or even essentially eliminated, by aggregating image data associated with different respective exposure times. Such image data aggregation can reduce motion artifacts that are common when using multiple exposure high dynamic range techniques, and the image data aggregation can help achieve high sensitivity in split-pixel image sensors, as discussed below.

Figure 2:
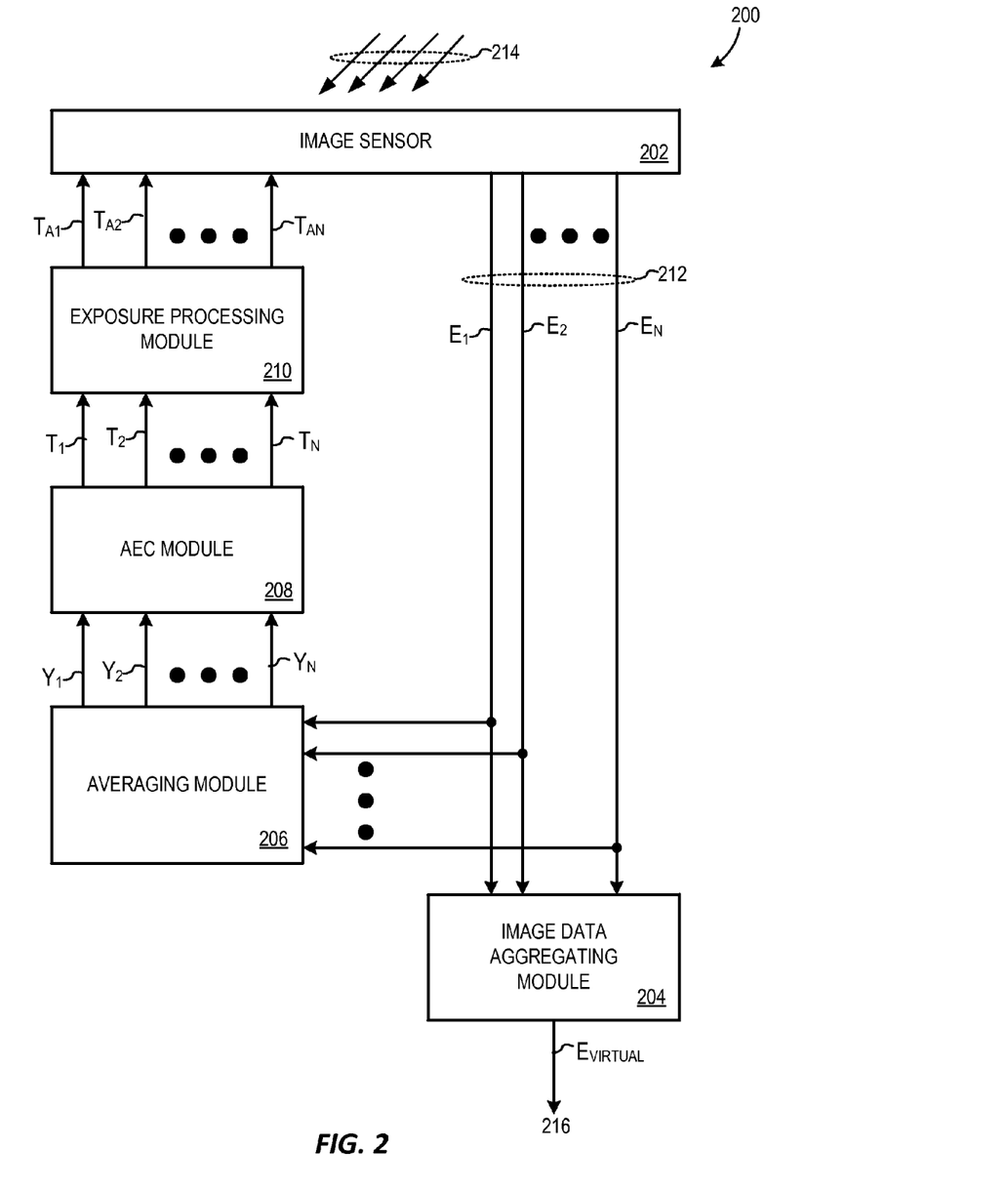
FIG. 2 illustrates an image data aggregating high dynamic range imaging system, according to an embodiment.

FIG. 2 illustrates an image data aggregating high dynamic range (IDAHDR) imaging system 200. IDAHDR imaging system 200 includes an image sensor 202, an image data aggregating module 204, an averaging module 206, an automatic exposure control (AEC) module 208, and an exposure processing module 210. Image sensor 202 includes an array of photodiodes (not shown) and repeatedly generates image data frames 212, where each image data frame 212 includes image data sets $E_1$ to $E_N$, where N is an integer greater than one. Each image data set E is an array of values, where each value of the array represents intensity of light 214 incident on a respective photodiode of image sensor 202.

Within each image data frame 212, each image data set E is generated with a different respective exposure time duration of the photodiodes of image sensor 202. Thus, N represents the number of different exposure time durations of image sensor 202. The longest exposure time duration corresponds to N=1, the second longest exposure time duration corresponds to N=2, and so on. For example, in some embodiments, N is two, and each first image data set $E_1$ represents incident light 214 captured with a first exposure time duration, and each second image data set E2 represents incident light 214 captured with a second exposure time duration, where the first exposure time duration is greater than the second exposure time duration. As another example, in some other embodiments, N is three, and each first image data set $E_1$ represents incident light 214 captured with a first exposure time duration, each second image data set $E_2$ represents incident light 214 captured with a second exposure time duration, and each third image data set $E_3$ represents incident light 214 captured with a third exposure time duration, where the first exposure time duration is greater than the second exposure time duration, and the second exposure time duration is greater than the third exposure time duration.

In some embodiments, image sensor 202 sequentially generates image data sets E within each image frame 212, such as by using multiple exposure techniques. One example of an embodiment employing multiple exposure techniques is discussed below with respect to FIG. 3. In some other embodiments, image sensor 202 concurrently generates image data sets E within each image data frame 212, such as by using a split-pixel image sensor. One example of an embodiment including a split-pixel image sensor is discussed below with respect to FIG. 4. Although FIG. 2 illustrates each image data set E being separately communicatively coupled to image data aggregating module 204 and averaging module 206, in some embodiments, two or more different image data sets E are communicatively coupled over a single data bus.

Image data aggregating module 204 generates a virtual long exposure image data set $E_{virtual}$ for each image data frame 212 by aggregating image data sets E within each image data frame 212, as follows:

$$E_{virtual} = E_1 + E_2 + \ldots + E_N \qquad \text{(EQN. 1)}$$

Thus, each virtual long exposure image data set $E_{virtual}$ is any array of values, where each value of the array is the sum of intensity values for each of the N exposure times of a respective photodiode. Image data aggregating module 204 could be modified to scale image data sets E, as well as sum image data sets E, without departing from the scope hereof. Image data sets E and virtual long exposure image data sets $E_{virtual}$ could be either in the analog or digital domain.

Virtual long exposure image data sets $E_{virtual}$ are, for example, communicatively coupled 216 to other modules or systems (not shown) for display, storage, and/or post-processing. Virtual long exposure image data sets $E_{virtual}$ advantageously have a high dynamic range because they represent image data captured at two or more different exposure time durations. Additionally, aggregation of image data sets E effectively increases image sensor 202 sensitivity because $E_{virtual}$ represents collective intensity of incident light 214 over N different exposures. This sensitivity increase can be particularly advantageous in embodiments where image sensor 202 is a split-pixel image sensor and would otherwise have low sensitivity under low light conditions.

Averaging module 206 generates average values $Y_1, Y_2$, to $Y_N$ representing the average values of image data sets $E_1, E_2$, to $E_N$, respectively. In some alternate embodiments, averaging module 206 generates average values Y for only a subset of image data sets E. For example, in one particular alternate embodiment, averaging module 206 only generates average value $Y_1$; in other words, averaging module 206 does not generate average values $Y_2$ to $Y_N$ in this alternate embodiment.

AEC module 208 determines desired exposure times $T_1$, $T_2$, to $T_N$ at least partially based on average values Y to control exposure time durations in subsequent image data frames 212, to substantially maximize dynamic range of IDAHDR imaging system 200. Each of the N desired exposure times T corresponds to a respective one of the N exposure time durations of image sensor 202. AEC module 208 determines each desired exposure time T from one or more of average values Y using AEC techniques known in the art for obtaining high dynamic range. For example, in some embodiments, AEC module 208 determines desired exposure times T from each of average values $Y_1, Y_2$, to $Y_N$, while in some other embodiments, AEC module 208 determines desired exposure times T from only average value $Y_1$.

As discussed above, each virtual long exposure image data set $E_{virtual}$ is the aggregate of image data sets E of a given image data frame 212. AEC module 208, however, does not account for such aggregation when determining desired exposure times T. Accordingly, exposure processing module 210 generates N adjusted exposure times TA based at least in part on the N desired exposure times T, to account for this aggregation. Each of the N adjusted exposure times $T_A$ also corresponds to a respective one of the N exposure time durations of image sensor 202.

In some embodiments, exposure processing module 210 generates adjusted exposure times TA by scaling desired exposure times T according EQN. 2, where X is an integer ranging from 1 to N, and EQN. 2 is evaluated from each value of X:

$$T_{AX} = T_X \frac{T_X}{(T_X + T_{X+1} + \ldots + T_N)} \qquad \text{(EQN. 2)}$$

EQN. 2, however, can be approximated as follows under typical conditions for values of X ranging from 1 to N−1:

$$T_{AX} = T_X - T_{X+1} - \ldots - T_N \qquad \text{(EQN. 3)}$$

EQN. 3 is typically simpler to evaluate than EQN. 2. Accordingly, certain embodiments of exposure processing module 210 evaluate EQN. 3, instead of EQN. 2, for each value of X ranging from 1 to N−1, and exposure processing module 210 sets $T_{AN}$ to $T_N$ in these embodiments.

For example, in some embodiments where N is equal to 2 and exposure processing module 210 evaluates EQN. 3, $T_{A1}$ and $T_{A2}$ are defined as follows in EQNS. 4 and 5, respectively:

$$T_{A1} = T_1 - T_2 \qquad \text{(EQN. 4)}$$

$$T_{A2} = T_2 \qquad \text{(EQN. 5)}$$

As another example, in some embodiments where N is equal to 3 and exposure processing module 210 evaluates EQN. 3, $T_{A1}$, $T_{A2}$, and $T_{A3}$ are defined as follows in EQNS. 6-8, respectively:

$$T_{A1} = T_1 - T_2 - T_3 = T_1 - (T_2 + T_3) \qquad \text{(EQN. 6)}$$

$$T_{A2} = T_2 - T_3 \qquad \text{(EQN. 7)}$$

$$T_{A3} = T_3 \qquad \text{(EQN. 8)}$$

As another yet example, in some embodiments where N is equal to 4 and exposure processing module 210 evaluates EQN. 3, $T_{A1}$, $T_{A2}$, $T_{A3}$, and $T_{A4}$ are defined as follows in EQNS. 9-12, respectively:

$$T_{A1} = T_1 - T_2 - T_3 - T_4 = T_1 - (T_2 + T_3 + T_4) \qquad \text{(EQN. 9)}$$

$$T_{A2} = T_2 - T_3 - T_4 = T_2 - (T_3 + T_4) \qquad \text{(EQN. 10)}$$

$$T_{A3} = T_3 - T_4 \qquad \text{(EQN. 11)}$$

$$T_{A4} = T_4 \qquad \text{(EQN. 12)}$$

As discussed above, $T_{AN} = T_N$. Consequently, the shortest exposure time duration is unchanged by exposure processing module 210. Accordingly, in some embodiments, exposure processing module 210 simply passes $T_N$ through as $T_{AN}$.

After exposure processing module 210 generates N adjusted exposure times $T_A$, image sensor 202 generates subsequent image data sets E according to adjusted exposure times $T_A$. In particular, image sensor 202 generates a first subsequent image data set $E_1$ having an exposure time duration defined by first adjusted exposure time duration $T_{A1}$, image sensor 202 generates a second subsequent image data set $E_2$ having an exposure time duration defined by second adjusted exposure time duration $T_{A2}$, and so on. Thus, the exposure time durations of each image data frame 212 are a function of a preceding image data frame 212, with the possible example of an initial image data frame 212, where desired exposure times T and/or adjusted exposure times $T_A$ may be predetermined initial values. Image data aggregating module 204 aggregates the subsequent image data sets E to obtain a subsequent virtual long exposure image data set $E_{virtual}$.

As can be appreciated from EQNS. 2 and 3, each adjusted exposure time $T_A$ is less than its corresponding desired exposure time T, with the exception $T_{A1}$ and $T_{AN}$, which are the same. Thus, use of exposure processing module 210 reduces differences in exposure time durations across image data sets E of a given image data frame 212, thereby reducing potential for motion artifacts, relative to an imaging system where exposure times are not adjusted.

Image data aggregating module 204, averaging module 206, AEC module 208, and exposure processing module 210 are implemented in hardware in certain embodiments. In some other embodiments, at least a portion of one or more of these modules is implemented by a processor executing instructions, in the form of software and/or firmware, for performing functions of the one or more modules. Although aggregating module 204, averaging module 206, AEC module 208, and exposure processing module 210 are illustrated in FIG. 2 as being discrete elements, two or more of these modules could be partially or completely combined without departing from the scope hereof. Additionally, one or more of these modules could be integrated within image sensor 202. For example, in some embodiments, image data aggregating module 204 is integrated within image sensor 202.

Figure 3:
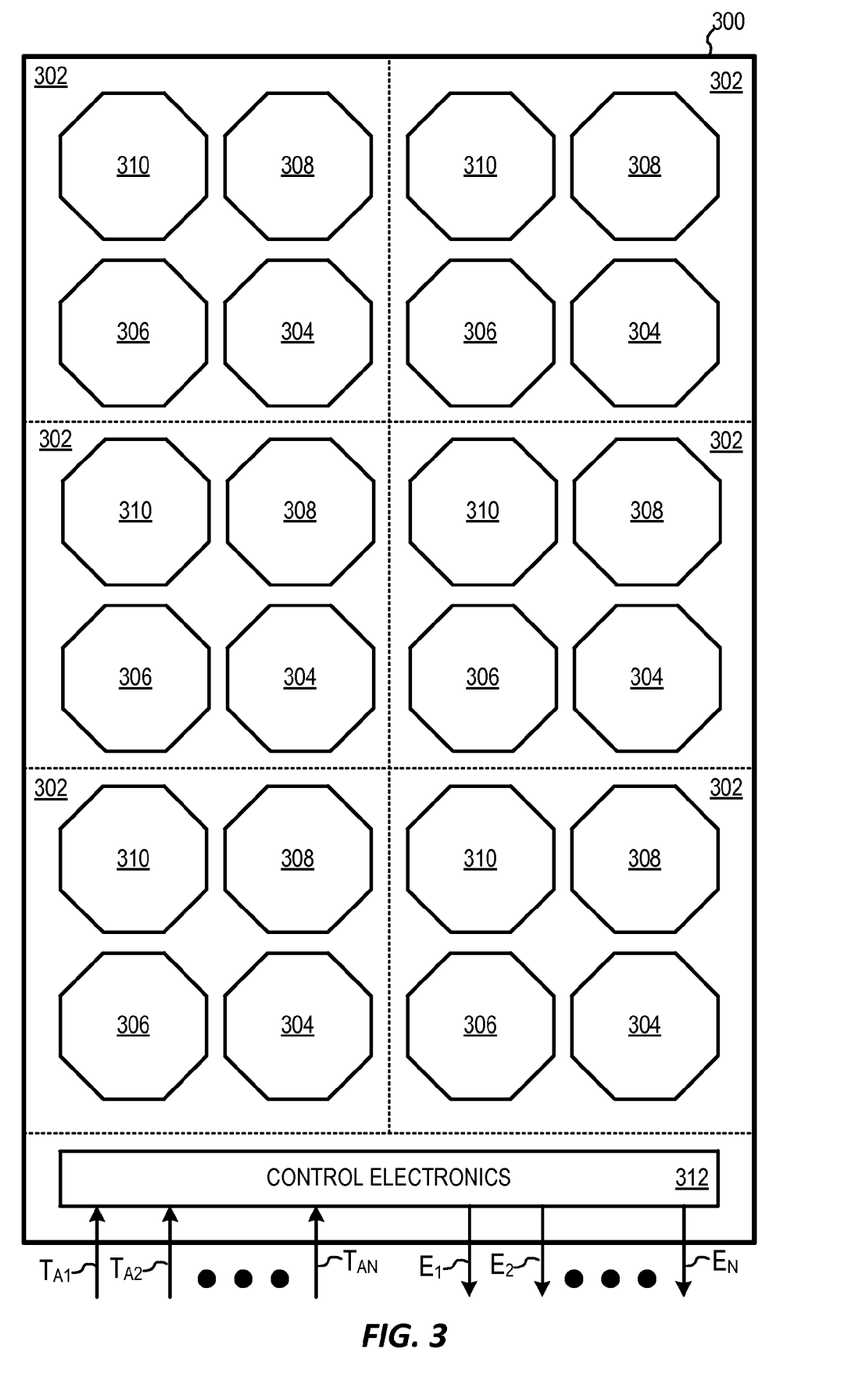
FIG. 3 illustrates one possible embodiment of an image sensor of the FIG. 2 image data aggregating high dynamic range imaging system.

FIG. 3 illustrates an image sensor 300, which is one possible embodiment of image sensor 202 of FIG. 2. Image sensor 300 includes an array of pixels 302, where each pixel 302 includes a photodiode 304, a photodiode 306, a photodiode 308, and a photodiode 310. Each photodiode 304, 306, 308, 310 generates a respective electrical charge in response to light incident thereon. In some embodiments, image sensor 300 is a complementary metal oxide semiconductor (CMOS) image sensor or a charge coupled device (CCD) image sensor. Each pixel 302 optionally further includes a color filter array (not shown) such that each photodiode 304, 306, 308, 310 captures a predetermined color of incident light. Some possible examples of a color filter array include, but are not limited to, a Bayer color filter array, a red-green-blue-emerald color filter array, a cyan-yellow-yellow-magenta color filter array, a cyan-yellow-green-magenta color filter array, and a red-green-blue-white color filter array. In the illustrated embodiment, each pixel comprises four photodiodes. In other embodiments, each pixel comprises two, eight or some other number of photodiodes.

Image sensor 300 further includes control electronics 312 which at least partially controls operation of photodiodes 304, 306, 308, 310 and reading of integrated charge therefrom. For example, control electronics 312 controls exposure time duration of photodiodes 304, 306, 308, 310 according to adjusted exposure time signals $T_{A1}$, $T_{A2}$, to $T_{AN}$ so that image sensor 300 generates image data sets $E_1$, $E_2$, to $E_N$ having exposure time durations defined by $T_{A1}$, $T_{A2}$, to $T_{AN}$, respectively. Control electronics 312 is configured to either sequentially generate image data sets $E_1$, $E_2$, to $E_N$ one after another, or to generate image data sets $E_1$, $E_2$, to $E_N$ partially in parallel using a rolling shutter technique.

Figure 4:
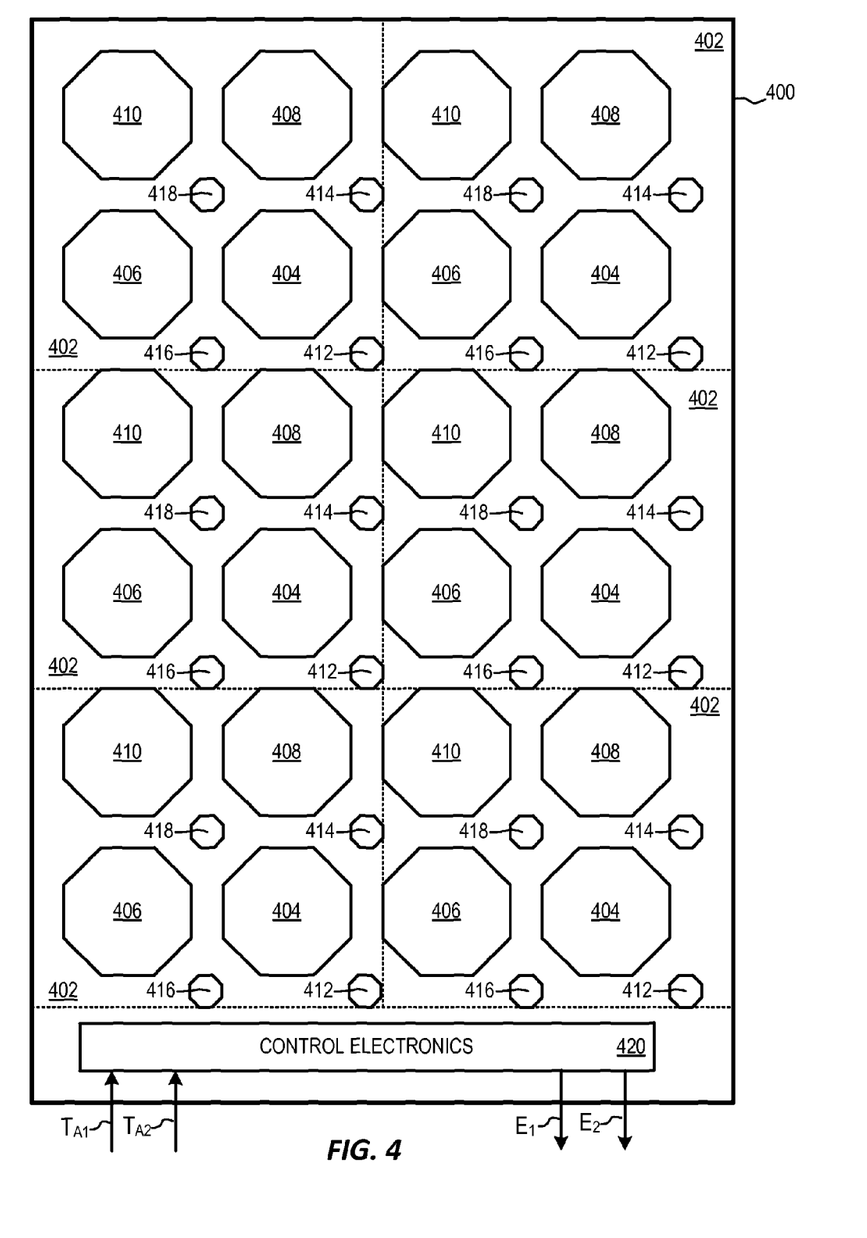
FIG. 4 illustrates another possible embodiment of the image sensor of the FIG. 2 image data aggregating high dynamic range imaging system.

FIG. 4 illustrates a split-pixel image sensor 400, which is another possible embodiment of image sensor 202 of FIG. 2 in embodiments where N is equal to 2. Split-pixel image sensor 400 includes an array of pixels 402, where pixel 402 includes four large photodiodes 404, 406, 408, 410 and four small photodiodes 412, 414, 416, 418. Large photodiodes 404, 406, 408, 410 are optimized for capturing high intensity light, and small photodiodes 412, 414, 416, 418 are optimized for capturing low intensity light. Accordingly, large photodiodes 404, 406, 408, 410 of pixels 402 generate first image data set $E_1$, and small photodiodes 412, 414, 416, 418 generate second image data set $E_2$. Each pixel 402 optionally includes a color filter array (not shown), such as one of the color filter arrays discussed above with respect to FIG. 3. For example, in certain embodiments, each pixel 402 includes a Bayer color filter array, such that large photodiodes 404 and small photodiodes 412 capture red-color light, large photodiodes 406, 408 and small photodiodes 414, 416 capture green-color light, and large photodiodes 410 and small photodiodes 418 capture blue-color light.

Image sensor 400 further includes control electronics 420 which at least partially controls operation of photodiodes 404, 406, 408, 410, 412, 414, 416, 418 and reading of integrated charge therefrom. For example, control electronics 420 controls exposure time duration of large photodiodes 404, 406, 408, 410 according to first adjusted exposure time $T_{A1}$ to generate first image data set $E_1$, and control electronics 420 controls exposure time duration of small photodiodes 412, 414, 416, 418 according to second adjusted exposure time $T_{A2}$ to generate second image data set $E_2$.

Figure 5:
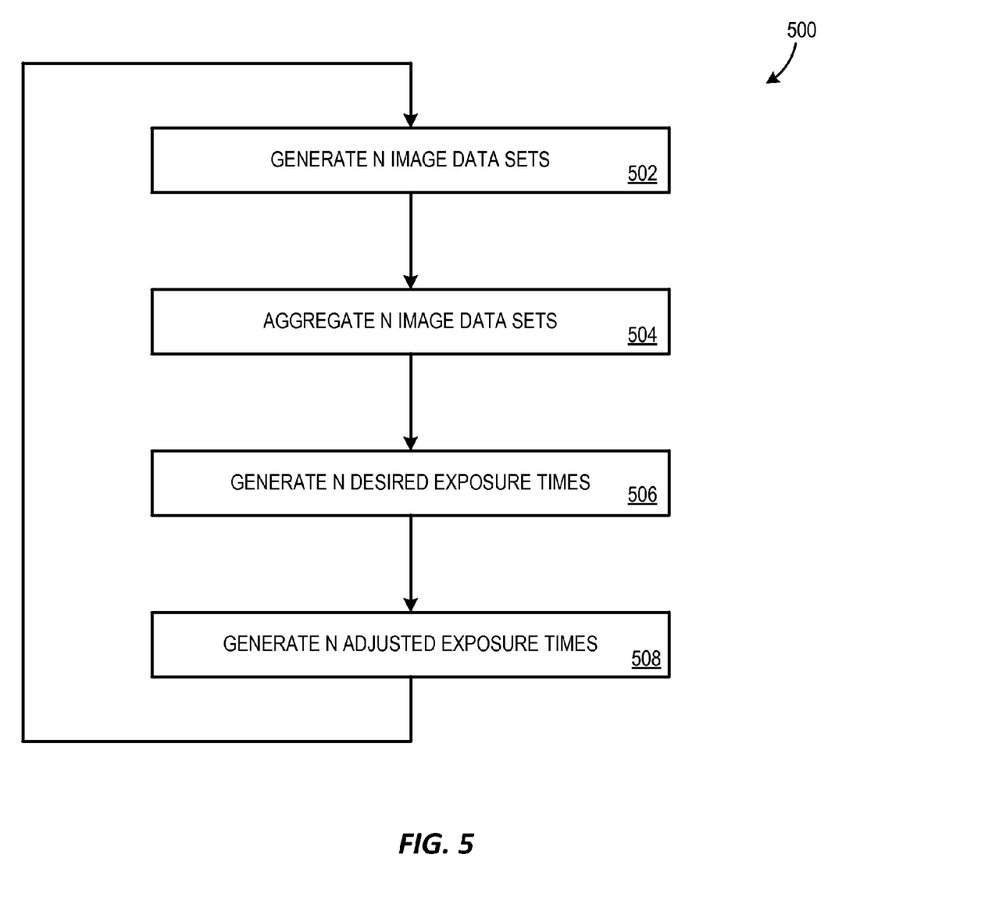
FIG. 5 illustrates a method for generating a virtual long exposure image data set, according to an embodiment.

FIG. 5 illustrates a method 500 for generating a virtual long exposure image data set. In step 502, N image data sets are generated from an array of photodiodes, where each of the N image data sets is generated with a different respective exposure time duration of the array of photodiodes, and N is an integer greater than one. In one example of step 502, N is equal to three, and image sensor 300 (FIG. 3) generates first image data set $E_1$, second image data set $E_2$, and third image data set $E_3$ with exposure time durations defined according to first adjusted exposure time duration $T_{A1}$, second adjusted exposure time duration $T_{A2}$, and third adjusted exposure time duration $T_{A3}$, respectively. In another example of step 502, N is equal to two, and image sensor 400 (FIG. 4) generates first image data set $E_1$ and second image data set $E_2$ with exposure time durations defined according to first adjusted exposure time duration $T_{A1}$ and second adjusted exposure time duration $T_{A2}$, respectively.

In step 504, the N image data sets are aggregated to obtain the virtual long exposure image data set. In one example of step 504 where N is equal to three, image data aggregating module 204 sums first image data set $E_1$, second image data set $E_2$, and third image data set $E_3$ to obtain virtual long exposure image data set $E_{virtual}$. In another example of step 504 where N is equal to two, image data aggregating module 204 sums first image data set E1 and second image data set $E_2$ to obtain virtual long exposure image data set $E_{virtual}$.

In step 506, N desired exposure times are generated based at least in part on an average value of one of the N image data sets. In one example of step 506, AEC module 208 generates desired exposure times $T_1$, $T_2$, to $T_N$ at least partially based on average value $Y_1$. In step 508, N adjusted exposure times are generated based at least in part on the N desired exposure times. In one example of step 508, exposure processing module 210 generates adjusted exposure times $T_{A1}$, $T_{A2}$, to $T_{A(N-1)}$ according to EQN. 3, and exposure processing module 210 passes $T_N$ through as $T_{AN}$. Steps 502-508 then repeat such that subsequent image data sets and a subsequent virtual long exposure image data set are generated.

Combinations of Features

Features described above as well as those claimed below may be combined in various ways without departing the scope hereof. The following examples illustrate some possible combinations:

(A1) A method for generating a virtual long exposure image data set may include: (1) generating N image data sets from an array of photodiodes, each of the N image data sets being generated with a different respective exposure time duration of the array of photodiodes, N being an integer greater than one, and (2) aggregating the N image data sets to obtain the virtual long exposure image data set.

(A2) In the method denoted as (A1), the step of aggregating the N image data sets may include summing the N image data sets.

(A3) Either of the methods denoted as (A1) or (A2) may further include: (1) generating N desired exposure times based at least in part on an average value of one of the N image data sets, (2) generating N adjusted exposure times based at least in part on the N desired exposure times, and (3) generating N subsequent image data sets from the array of photodiodes, the N subsequent image data sets being generated with respective exposure time durations of the array of photodiodes according to the N adjusted exposure times.

(A4) The method denoted as (A3) may further include aggregating the N subsequent image data sets to obtain a subsequent virtual long exposure image data set.

(A5) In the method denoted as (A4), the step of aggregating the N subsequent image data sets may include summing the N subsequent image data sets.

(A6) In any of the methods denoted as (A3) through (A5), the step of generating N adjusted exposure times may include: (1) determining a first one the N adjusted exposure times from a difference between a first one of the N desired exposure times and a second one of the N desired exposure times, and (2) determining a second one of the N adjusted exposure times to be equal to the second one of the N desired exposure times.

(A7) In any of the methods denoted as (A3) through (A5), the step of generating N adjusted exposure times may include: (1) determining a first one the N adjusted exposure times from a difference between a first one of the N desired exposure times and a sum of a second one of the N desired exposure times and a third one of the N desired exposure times, (2) determining a second one of the N adjusted exposure times from a difference between the second one of the N desired exposure times and the third one of the N desired exposure times, and (3) determining a third one of the N adjusted exposure times to be equal to the third one of the N desired exposure times.

(A8) In any of the methods denoted as (A3) through (A5), the step of generating N adjusted exposure times may include: (1) determining a first one the N adjusted exposure times from a difference between a first one of the N desired exposure times and a sum of a second one of the N desired exposure times, a third one of the N desired exposure times, and a fourth one of the N desired exposure times, (2) determining a second one the N adjusted exposure times from a difference between the second one of the N desired exposure times and a sum of the third one of the N desired exposure times and the fourth one of the N desired exposure times, (3) determining a third one of the N adjusted exposure times from a difference between the third one of the N desired exposure times and the fourth one of the N desired exposure times, and (4) determining a fourth one of the N adjusted exposure times to be equal to the fourth one of the N desired exposure times.

(A9) In any of the methods denoted as (A3) through (A5), the step of generating N adjusted exposure times may include determining at least one of the N adjusted exposure times at least partially from a difference between one of the N desired exposure times and another one of the N desired exposure times.

(A10) In any of the methods denoted as (A1) through (A9), the step of generating N image data sets may include sequentially generating the N image data sets.

(A11) In any of the methods denoted as (A1) through (A9), the step of generating N image data sets may include concurrently generating the N image data sets.

(B1) An image data aggregating high dynamic range imaging system may include an image sensor for generating N image data sets from array of photodiodes, where N is an integer greater than one. The image sensor may be adapted to generate each of the N image data sets with a different respective exposure time duration of the array of photodiodes. The image data aggregating high dynamic range imaging system may further include an image data aggregating module for aggregating the N image data sets to obtain a virtual long exposure image data set.

(B2) In the image data aggregating high dynamic range imaging system denoted as (B1), the image data aggregating module may be adapted to sum the N image data sets to obtain the virtual long exposure image data set.

(B3) Either of the image data aggregating high dynamic range imaging systems denoted as (B1) or (B2) may further include: (1) an automatic exposure control module for generating N desired exposure times based at least in part on an average value of one of the N image data sets and (2) an exposure processing module for generating N adjusted exposure times based at least in part on the N desired exposure times. The image sensor may be adapted to generate N subsequent image data sets from the array of photodiodes, the N subsequent image data sets being generated with respective exposure time durations of the array of photodiodes according to the N adjusted exposure times.

(B4) In the image data aggregating high dynamic range imaging system denoted as (B3), the exposure processing module may be adapted to determine at least one of the N adjusted exposure times at least partially from a difference between one of the N desired exposure times and another one of the N desired exposure times.

(B5) Either of the image data aggregating high dynamic range imaging systems denoted as (B3) or (B4) may further include an averaging module for generating the average value of one the N image data sets.

(B6) In any of the image data aggregating high dynamic range imaging systems denoted as (B1) through (B5), the image sensor may be capable of sequentially generating the N image data sets.

(B7) In any of the image data aggregating high dynamic range imaging systems denoted as (B1) through (B5), the image sensor may be capable of concurrently generating the N image data sets.

(B8) In the image data aggregating high dynamic range imaging system denoted as (B7), the image sensor may include a split-pixel image sensor.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for generating a virtual long exposure image data set, comprising:
   generating N image data sets from an array of photodiodes, each of the N image data sets being generated with a different respective exposure time duration of the array of photodiodes, N being an integer greater than one;
   aggregating the N image data sets to obtain the virtual long exposure image data set, the step of aggregating the N image data sets including summing the N image data sets;
   generating N desired exposure times based at least in part on an average value of one of the N image data sets;
   generating N adjusted exposure times based at least in part on the N desired exposure times; and
   generating N subsequent image data sets from the array of photodiodes, the N subsequent image data sets being generated with respective exposure time durations of the array of photodiodes according to the N adjusted exposure times;
   the step of generating N adjusted exposure times including:
      determining a first one of the N adjusted exposure times from a difference between a first one of the N desired exposure times and a second one of the N desired exposure times, and
      determining a second one of the N adjusted exposure times to be equal to the second one of the N desired exposure times.

2. The method of claim 1, further comprising aggregating the N subsequent image data sets to obtain a subsequent virtual long exposure image data set.

3. The method of claim 2, the step of aggregating the N subsequent image data sets comprising summing the N subsequent image data sets.

4. The method of claim 1, the step of generating N image data sets comprising sequentially generating the N image data sets.

5. The method of claim 1, the step of generating N image data sets comprising concurrently generating the N image data sets.

6. A method for generating a virtual long exposure image data set, comprising:
   generating N image data sets from an array of photodiodes, each of the N image data sets being generated with a different respective exposure time duration of the array of photodiodes, N being an integer greater than one;
   aggregating the N image data sets to obtain the virtual long exposure image data set, the step of aggregating the N image data sets including summing the N image data sets;
   generating N desired exposure times based at least in part on an average value of one of the N image data sets;
   generating N adjusted exposure times based at least in part on the N desired exposure times; and
   generating N subsequent image data sets from the array of photodiodes, the N subsequent image data sets being generated with respective exposure time durations of the array of photodiodes according to the N adjusted exposure times;
   the step of generating N adjusted exposure times including:
      determining a first one of the N adjusted exposure times from a difference between a first one of the N desired exposure times and a sum of a second one of the N desired exposure times and a third one of the N desired exposure times,
      determining a second one of the N adjusted exposure times from a difference between the second one of the N desired exposure times and the third one of the N desired exposure times, and
      determining a third one of the N adjusted exposure times to be equal to the third one of the N desired exposure times.

7. The method of claim 6, further comprising aggregating the N subsequent image data sets to obtain a subsequent virtual long exposure image data set.

8. The method of claim 7, the step of aggregating the N subsequent image data sets comprising summing the N subsequent image data sets.

9. The method of claim 6, the step of generating N image data sets comprising sequentially generating the N image data sets.

10. The method The method of claim 6, the step of generating N image data sets comprising concurrently generating the N image data sets.

11. A method for generating a virtual long exposure image data set, comprising:
    generating N image data sets from an array of photodiodes, each of the N image data sets being generated with a different respective exposure time duration of the array of photodiodes, N being an integer greater than one;
    aggregating the N image data sets to obtain the virtual long exposure image data set, the step of aggregating the N image data sets including summing the N image data sets;
    generating N desired exposure times based at least in part on an average value of one of the N image data sets;
    generating N adjusted exposure times based at least in part on the N desired exposure times; and
    generating N subsequent image data sets from the array of photodiodes, the N subsequent image data sets being generated with respective exposure time durations of the array of photodiodes according to the N adjusted exposure times;
    the step of generating N adjusted exposure times comprising:
       determining a first one of the N adjusted exposure times from a difference between a first one of the N desired exposure times and a sum of a second one of the N desired exposure times, a third one of the N desired exposure times, and a fourth one of the N desired exposure times,
       determining a second one the N adjusted exposure times from a difference between the second one of the N desired exposure times and a sum of the third one of the N desired exposure times and the fourth one of the N desired exposure times,
       determining a third one of the N adjusted exposure times from a difference between the third one of the N desired exposure times and the fourth one of the N desired exposure times, and
       determining a fourth one of the N adjusted exposure times to be equal to the fourth one of the N desired exposure times.

12. The method of claim 11, further comprising aggregating the N subsequent image data sets to obtain a subsequent virtual long exposure image data set.

13. The method of claim 12, the step of aggregating the N subsequent image data sets comprising summing the N subsequent image data sets.

14. The method of claim 11, the step of generating N image data sets comprising sequentially generating the N image data sets.

15. The method of claim 11, the step of generating N image data sets comprising concurrently generating the N image data sets.

\* \* \* \* \*

UNITED STATES PATENT AND TRADEMARK OFFICE
CERTIFICATE OF CORRECTION

PATENT NO. : 9,172,869 B2  
APPLICATION NO. : 14/097015  
DATED : October 27, 2015  
INVENTOR(S) : Kuang et al.

Page 1 of 1

It is certified that error appears in the above-identified patent and that said Letters Patent is hereby corrected as shown below:

In the Specification

Column 1, line 42, "pixel 102 include" should read -- pixel 102 includes --;

Column 2, line 63, "set E2" should read -- set $E_2$ --;

Column 4, line 18, "according EQN. 2" should read -- according to EQN. 2 --;

Column 4, line 52, "As another yet example" should read -- As yet another example --;

Column 5, line 20, "the exception $T_{A1}$" should read -- the exception of $T_{A1}$ --;

Column 7, line 39, "one the N" should read -- one of the N --;

Column 7, line 47, "one the N" should read -- one of the N --;

Column 7, line 59, "one the N" should read -- one of the N --;

Column 7, line 64, "one the N" should read -- one of the N --;

Column 8, line 20, "from array" should read -- from an array --;

Column 8, line 53, "one the N" should read -- one of the N --;

In the Claims

Column 10, line 23, "The method The method of claim 6," should read -- The method of claim 6, --;

Column 10, line 53, "one the N" should read -- one of the N --.

Signed and Sealed this  
Twenty-eighth Day of June, 2016

Michelle K. Lee  
*Director of the United States Patent and Trademark Office*